United States Patent
Wang et al.

(10) Patent No.: US 10,409,709 B2
(45) Date of Patent: Sep. 10, 2019

(54) DEBUGGING METHOD, MULTI-CORE PROCESSOR AND DEBUGGING DEVICE

(71) Applicant: HUAWEI TECHNOLOGIES CO., LTD., Shenzhen, Guangdong (CN)

(72) Inventors: Mingfa Wang, Hangzhou (CN); Gang Yu, Beijing (CN); Haichuan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/934,329

(22) Filed: Mar. 23, 2018

(65) Prior Publication Data

US 2018/0210811 A1 Jul. 26, 2018

Related U.S. Application Data

(63) Continuation of application No. PCT/CN2016/099995, filed on Sep. 24, 2016.

(30) Foreign Application Priority Data

Sep. 25, 2015 (CN) .......................... 2015 1 0623211

(51) Int. Cl.
| | |
|---|---|
| *G06F 11/36* | (2006.01) |
| *G06F 11/22* | (2006.01) |
| *G06F 9/54* | (2006.01) |

(52) U.S. Cl.
CPC ............ *G06F 11/362* (2013.01); *G06F 9/545* (2013.01); *G06F 11/2242* (2013.01);
(Continued)

(58) Field of Classification Search
CPC ........................ G06F 9/545; G06F 11/36–3696
(Continued)

(56) References Cited

U.S. PATENT DOCUMENTS

| | | | |
|---|---|---|---|
| 6,886,110 B2 | 4/2005 | O'Brien | |
| 7,581,087 B2 * | 8/2009 | John | .................. G06F 11/2236 703/20 |

(Continued)

FOREIGN PATENT DOCUMENTS

| | | |
|---|---|---|
| CN | 1139876 | 2/2004 |
| CN | 17799652 | 5/2006 |

(Continued)

OTHER PUBLICATIONS

Lee, K-J, et al., A Software/Hardware Co-Debug Platform for Multi-Core Systems, 9th IEEE International Conference on ASIC, Oct. 25-28, 2011, 4 pages, [retrieved on Jun. 12, 2019], Retrieved from the Internet.*

(Continued)

*Primary Examiner* — Geoffrey R St Leger
(74) *Attorney, Agent, or Firm* — Conley Rose, P.C.

(57) ABSTRACT

Embodiments of the present invention relate to the field of computer technologies. The embodiments of the present invention provide a debugging method, including: starting, by a core A of a multi-core processor after completing execution of a preset event processing routine, to stop running, and sending a running stop signal to other cores in a process of stopping running; after receiving a first stop termination instruction and resuming running, executing a debugging information collection function to collect debugging information of the preset event, and stopping running after completing the execution of the debugging information collection function; and after receiving a second stop termination instruction and resuming running, sending a running resumption instruction to the other cores. By means of the technical solutions provided in the embodiments of the present invention, kernel mode code and user mode code can be masked on a same debugging platform.

20 Claims, 8 Drawing Sheets

(52) U.S. Cl.
CPC .......... *G06F 11/36* (2013.01); *G06F 11/3636* (2013.01); *G06F 11/3648* (2013.01); *G06F 11/3664* (2013.01)

(58) Field of Classification Search
USPC ................................................ 717/124–135
See application file for complete search history.

(56) References Cited

U.S. PATENT DOCUMENTS

| | | | |
|---|---|---|---|
| 7,707,022 | B2 | 4/2010 | O'Brien |
| 8,024,591 | B2 * | 9/2011 | Bertelsen .............. G06F 1/3203 713/323 |
| 8,370,806 | B2 * | 2/2013 | Codrescu .............. G06F 9/3005 714/35 |
| 9,158,574 | B2 * | 10/2015 | Mansell .............. G06F 11/3636 |
| 2004/0098639 | A1 | 5/2004 | Liu |
| 2006/0059286 | A1 * | 3/2006 | Bertone .............. G06F 9/30014 710/260 |
| 2007/0168651 | A1 * | 7/2007 | John ................... G06F 11/2236 712/227 |
| 2008/0115113 | A1 * | 5/2008 | Codrescu .............. G06F 9/3005 717/127 |
| 2008/0307244 | A1 * | 12/2008 | Bertelsen .............. G06F 1/3203 713/323 |
| 2008/0312900 | A1 * | 12/2008 | Akiba .................... G06F 9/455 703/23 |
| 2009/0089622 | A1 | 4/2009 | Qi et al. |
| 2010/0174892 | A1 | 7/2010 | Steeb |
| 2011/0185153 | A1 * | 7/2011 | Henry .................. G06F 9/3861 712/30 |
| 2012/0166837 | A1 * | 6/2012 | Henry .................. G06F 1/3206 713/321 |
| 2012/0210103 | A1 | 8/2012 | Liao et al. |
| 2013/0031419 | A1 * | 1/2013 | Haverkamp ........ G06F 11/3656 714/45 |
| 2013/0067133 | A1 * | 3/2013 | Mansell .............. G06F 11/3636 710/267 |
| 2014/0108761 | A1 | 4/2014 | Escandell et al. |
| 2014/0281735 | A1 | 9/2014 | Olivarez et al. |
| 2015/0067655 | A1 | 3/2015 | Sauzede et al. |
| 2016/0062863 | A1 | 3/2016 | Graf |
| 2016/0231376 | A1 * | 8/2016 | Kris ................... G01R 31/2851 |
| 2016/0378626 | A1 * | 12/2016 | Klazynski ............. G06F 11/079 714/37 |
| 2017/0062075 | A1 * | 3/2017 | Barber ............. G11C 29/12015 |

FOREIGN PATENT DOCUMENTS

| | | |
|---|---|---|
| CN | 1282085 | 10/2006 |
| CN | 101506777 | 8/2009 |
| CN | 101515251 | 8/2009 |
| CN | 101398780 | 8/2011 |
| CN | 101540706 | 12/2011 |
| CN | 102346708 | 2/2012 |
| CN | 101504626 | 6/2012 |
| CN | 101685420 | 6/2013 |
| CN | 1032226504 | 7/2013 |
| CN | 102073565 | 2/2014 |
| CN | 103729288 | 4/2014 |
| CN | 102521087 | 11/2014 |
| CN | 105354136 | 2/2016 |
| EP | 2562650 | 2/2013 |
| WO | WO2014166526 | 10/2014 |
| WO | WO2017050287 | 3/2017 |

OTHER PUBLICATIONS

Backasch, R., et al., Runtime Verification for Multicore SoC with High-Quality Trace Data, ACM Transactions on Design Automation of Electronic Systems (TODAES), vol. 18 Issue 2, Mar. 2013, 26 pages, [retrieved on Jun. 12, 2019], Retrieved from the Internet.*
Extended European Search Report dated Aug. 9, 2018 in corresponding European Patent Application No. 16848167.9.
International Search Report dated Mar. 30, 2017 in corresponding International Patent Application No. PCT/CN2016/099995.
*GDB: The GNU Project Debugger*, Retrieved from internet on Apr. 26, 2018, http://www.gnu.org/software/gbd/ (4 pp.).
Lauterbach Development Tools, *Lauterbach and Wind River collaborate to support the full range of Wind River operating systems*, dated Feb. 15, 2015 (1 pg.).
International Search Report, dated Dec. 26, 2016, in International Application No. PCT/CN2016/099995 (5 pp.).
Written Opinion of the International Searching Authority, dated Dec. 26, 2016, in International Application No. PCT/CN2016/099995 (8 pp.).

* cited by examiner

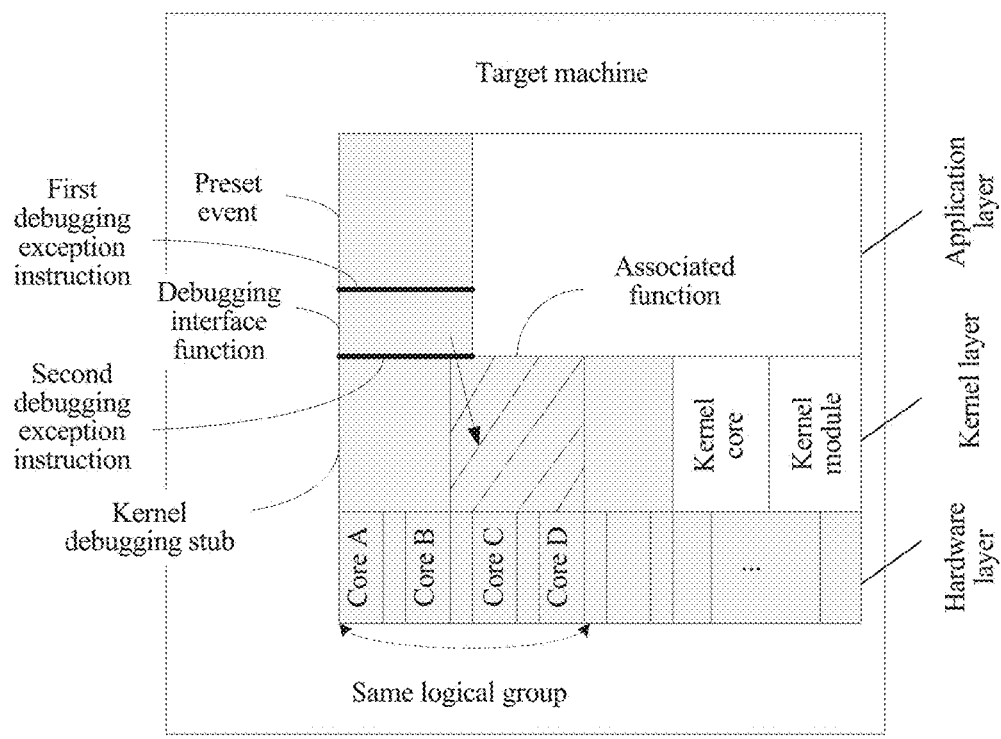
FIG. 5
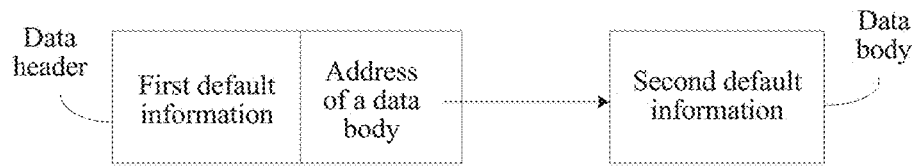
FIG. 6.1
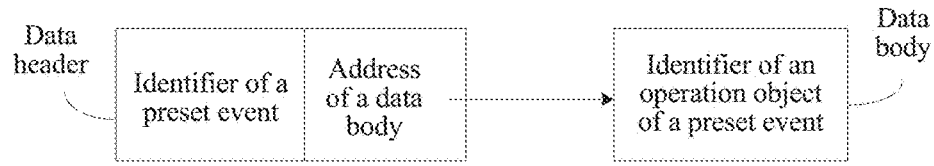
FIG. 6.2

DEBUGGING METHOD, MULTI-CORE PROCESSOR AND DEBUGGING DEVICE

CROSS-REFERENCE TO RELATED APPLICATIONS

This application is a continuation of International Application No. PCT/CN2016/099995, filed on Sep. 24, 2016, which claims priority to Chinese Patent Application No. 201510623211.5, filed on Sep. 25, 2015. The disclosures of the aforementioned applications are hereby incorporated by reference in their entireties.

TECHNICAL FIELD

Embodiments of the present invention relate to the field of computer technologies, and in particular, to a debugging method, a multi-core processor, and a debugging device.

BACKGROUND

Program debugging is a process in which a compiled computer program is tested manually or by using a method such as a compiling program before the compiled computer program is put into actual operation, so as to correct a syntax error and a logic error. This is an indispensable step for ensuring correctness of a computer information system. Therefore, the compiled computer program needs to be loaded into a computer for debugging.

Generally, code that runs in kernel space is referred to as kernel mode code, and code that runs in user space is referred to as user mode code in the industry. Currently, different debugging platforms need to be used to debug the kernel mode code and the user mode code. It should be noted that, a target machine described below refers to a physical machine in which the debugged code runs, and a host machine refers to a physical machine in which a debugger runs. For example, when user mode code is debugged, a debugger needs to run in an operating system of a target machine to perform local debugging; or when user mode code is debugged, a process tracing module (Ptrace) needs to be implanted into an operating system of a target machine, a debugging stub may further need to run in the operating system, and then a debugger runs in a host machine to perform remote debugging. When kernel mode code such as a kernel module is debugged, a kernel debugger needs to be implanted into an operating system of a target machine, and then a debugger runs in a host machine to perform remote debugging.

SUMMARY

Embodiments of the present invention provide a debugging method, a multi-core processor, and a debugging device, so as to debug kernel mode code and user mode code on a same debugging platform.

According to a first aspect, an embodiment of the present invention provides a debugging method, applied to a target machine in a remote debugging system, where the target machine includes a multi-core processor, and the method includes:

starting, by a core A of the multi-core processor after completing execution of a preset event processing routine, to stop running, and sending a running stop signal to other cores in a process of stopping running, where the running stop signal is used to instruct the other cores to stop running, the other cores refer to all cores that are located in the multi-core processor and that belong to a same logical group as the core A, and the preset event is a kernel module unloading function, a process deletion function, or a thread processing function;

after receiving a first stop termination instruction and resuming running, executing, by the core A, a debugging information collection function to collect debugging information of the preset event, and stopping running after completing the execution of the debugging information collection function, where the first stop termination instruction is sent by a debugging apparatus in the remote debugging system after the debugging apparatus determines that the core A stops running and that a reason that the core A stops running is a reason other than the preset event; and after receiving a second stop termination instruction and resuming running, sending, by the core A, a running resumption instruction to the other cores, where the running resumption instruction is used to instruct the other cores to resume running, the second stop termination instruction is sent by the debugging apparatus after the debugging apparatus masks an operation object of the preset event according to the debugging information of the preset event, and the operation object of the preset event is a kernel module, a process, or a thread.

With reference to the first aspect, in a first implementation manner of the first aspect, the debugging information collection function includes a debugging interface function, a first debugging exception instruction is set in a header of the debugging interface function, and the first debugging exception instruction is used to instruct the core A to stop running; and the starting, by a core A after completing execution of a preset event processing routine, to stop running, and sending a running stop signal to other cores in a process of stopping running specifically includes:

after completing the execution of the preset event processing routine, starting, by the core A, to execute the first debugging exception instruction located in the header of the debugging interface function, and sending the running stop signal to the other cores in a process of executing the first debugging exception instruction.

With reference to the first implementation manner of the first aspect, in a second implementation manner of the first aspect, the debugging information collection function further includes a function associated with the preset event, a second debugging exception instruction is further set in a trailer of the debugging interface function, and the second debugging exception instruction is used to instruct the core A to stop running; and the executing, by the core A, a debugging information collection function to collect debugging information of the preset event, and stopping running after completing the execution of the debugging information collection function specifically includes:

executing, by the core A, the function associated with the preset event to collect the debugging information of the preset event, and then executing the second debugging exception instruction located in the trailer of the debugging interface function.

With reference to the second implementation manner of the first aspect, in a third implementation manner of the first aspect, the function associated with the preset event is located in a kernel debugging stub, and the kernel debugging stub is implanted into an operating system of the target machine in advance.

With reference to any one of the first aspect, or the first implementation manner of the first aspect to the third implementation manner of the first aspect, in a fourth implementation manner of the first aspect, if the preset event is the kernel module unloading function, the operation object of the preset event is a kernel module;

if the preset event is the process deletion function, the operation object of the preset event is a process; and if the preset event is the thread deletion function, the operation object of the preset event is a thread.

With reference to any one of the first aspect, or the first implementation manner of the first aspect to the fourth implementation manner of the first aspect, in a fifth implementation manner of the first aspect, the debugging information of the preset event includes an identifier of the operation object of the preset event.

With reference to any one of the first aspect, or the first implementation manner of the first aspect to the fifth implementation manner of the first aspect, in a sixth implementation manner of the first aspect, the multi-core processor is integrated into a system on chip SOC;

the sending, by a core A, a running stop signal to other cores, where the running stop signal is used to instruct the other cores to stop running specifically includes:

sending, by the core A, the running stop signal to the other cores by using a hardware cross-trigger network of the SOC, where the running stop signal is used to instruct the other cores to stop running; and the sending, by the core A, a running resumption instruction to the other cores, where the running resumption instruction is used to instruct the other cores to resume running specifically includes:

sending, by the core A, the running resumption instruction to the other cores by using the hardware cross-trigger network of the SOC, where the running resumption instruction is used to instruct the other cores to resume running.

According to a second aspect, an embodiment of the present invention provides a debugging method, executed by a debugging apparatus deployed in a host machine, where the host machine is located in a remote debugging system, and the method includes:

determining, by the debugging apparatus after determining that a core A stops miming, a reason that the core A stops running, where the core A belongs to a multi-core processor of a target machine in the remote debugging system;

if the reason that the core A stops running is a preset event, obtaining, by the debugging apparatus, debugging information of the preset event, and masking an operation object of the preset event according to the debugging information of the preset event, where the preset event is a kernel module unloading function, a process deletion function, or a thread deletion function, and the operation object of the preset event is a kernel module, a process, or a thread; and instructing, by the debugging apparatus, the core A to resume running.

With reference to the second aspect, in a first implementation manner of the second aspect, if the reason that the core A stops running is a reason other than the preset event, instructing, by the debugging apparatus, the core A to resume running, to collect the debugging information of the preset event.

With reference to the second aspect or the first implementation manner of the second aspect, in a second implementation manner of the second aspect, the debugging information of the preset event includes an identifier of the operation object of the preset event; and the obtaining, by the debugging apparatus, debugging information of the preset event, and masking an operation object of the preset event according to the debugging information of the preset event specifically includes:

obtaining, by the debugging apparatus, the identifier of the operation object of the preset event, and masking the operation object of the preset event according to the identifier of the operation object of the preset event.

With reference to the second aspect, the first implementation manner of the second aspect, or the second implementation manner of the second aspect, in a third implementation manner of the second aspect, the debugging apparatus includes a debugger and a debugging agent;

the determining, by the debugging apparatus after determining that a core A stops running, a reason that the core A stops running, and if the reason that the core A stops running is a preset event, obtaining, by the debugging apparatus, debugging information of the preset event, and masking an operation object of the preset event according to the debugging information of the preset event specifically includes:

after determining, in a polling manner, that the core A stops running, determining, by the debugging agent, the reason that the core A stops running, and if the reason that the core A stops running is the preset event, reporting a second message to the debugger, where the second message includes an identifier indicating that the core A stops running and an identifier of the preset event; and after receiving the second message, obtaining, by the debugger, the debugging information of the preset event, and masking the operation object of the preset event according to the debugging information of the preset event; and the instructing, by the debugging apparatus, the core A to resume running specifically includes:

instructing, by the debugger, the debugging agent to send a second stop termination instruction to the core A, where the second stop termination instruction is used to instruct the core A to resume running.

With reference to the third implementation manner of the second aspect, in a fourth implementation manner of the second aspect, the determining, by the debugging apparatus after determining that a core A stops running, a reason that the core A stops running, and if the reason that the core A stops running is a reason other than the preset event, instructing, by the debugging apparatus, the core A to resume running, to collect the debugging information of the preset event specifically includes:

after determining, in a polling manner, that the core A stops running, determining, by the debugging agent, the reason that the core A stops running, and if the reason that the core A stops running is a reason other than the preset event, sending, by the debugging agent, a first stop termination instruction to the core A, where the first stop termination instruction is used to instruct the core A to resume running, to collect the debugging information of the preset event.

With reference to any one of the second aspect, or the first implementation manner of the second aspect to the third implementation manner of the second aspect, in a fifth implementation manner of the second aspect, the debugging apparatus includes the debugger and the debugging agent; and the determining, by the debugging apparatus after determining that a core A stops running, a reason that the core A stops running, and if the reason that the core A stops running is a reason other than the preset event, instructing, by the debugging apparatus, the core A to resume running, to collect the debugging information of the preset event specifically includes:

after determining, in a polling manner, that the core A stops running, determining, by the debugging agent, the reason that the core A stops running, and if the reason that the core A stops running is a reason other than the preset event, reporting a first message to the debugger, where the first message includes the identifier indicating that the core A stops running and a default identifier; and after receiving the first message, instructing, by the debugger, the debugging agent to send a first stop termination instruction to the core A, where the first stop termination instruction is used to instruct the core A to resume running, to collect the debugging information of the preset event.

With reference to any one of the second aspect, or the first implementation manner of the second aspect to the fifth implementation manner of the second aspect, in a sixth implementation manner of the second aspect, if the preset event is the kernel module unloading function, the operation object of the preset event is a kernel module;

if the preset event is the process deletion function, the operation object of the preset event is a process; and if the preset event is the thread deletion function, the operation object of the preset event is a thread.

According to a third aspect, an embodiment of the present invention provides a multi-core processor, applied to a target machine in a remote debugging system, where the multi-core processor includes a core A, other cores, and an input port, and the other cores refer to all cores that are located in the multi-core processor and that belong to a same logical group as the core A, where the core A is configured to: start to stop running after completing execution of a preset event processing routine, and send a running stop signal to the other cores in a process of stopping running, where the running stop signal is used to instruct the other cores to stop running, and the preset event is a kernel module unloading function, a process deletion function, or a thread deletion function;

the input port is configured to: receive a first stop termination instruction, and forward the first stop termination instruction to the core A, where the first stop termination instruction is sent by a debugging apparatus in the remote debugging system after the debugging apparatus determines that the core A stops running and that a reason that the core A stops running is a reason other than the preset event;

the core A is further configured to: after receiving the first stop termination instruction and resuming running, execute a debugging information collection function to collect debugging information of the preset event, and stop running after completing the execution of the debugging information collection function;

the input port is further configured to: receive a second stop termination instruction, and forward the second stop termination instruction to the core A, where the second stop termination instruction is sent by the debugging apparatus after the debugging apparatus masks an operation object of the preset event according to the debugging information of the preset event, and the operation object of the preset event is a kernel module, a process, or a thread; and the core A is further configured to send a running resumption instruction to the other cores after receiving the second stop termination instruction and resuming running, where the running resumption instruction is used to instruct the other cores to resume running.

With reference to the third aspect, in a first implementation manner of the third aspect, the debugging information collection function includes a debugging interface function, a first debugging exception instruction is set in a header of the debugging interface function, and the first debugging exception instruction is used to instruct the core A to stop running; and the core A is specifically configured to: after completing the execution of the preset event processing routine, start to execute the first debugging exception instruction located in the header of the debugging interface function, and send the running stop signal to the other cores in a process of executing the first debugging exception instruction.

With reference to the first implementation manner of the third aspect, in a second implementation manner of the third aspect, the debugging information collection function further includes a function associated with the preset event, a second debugging exception instruction is further set in a trailer of the debugging interface function, and the second debugging exception instruction is used to instruct the core A to stop running; and the core A is specifically configured to: execute the function associated with the preset event to collect the debugging information of the preset event, and then execute the second debugging exception instruction located in the trailer of the debugging interface function.

With reference to the second implementation manner of the third aspect, in a third implementation manner of the third aspect, the function associated with the preset event is located in a kernel debugging stub, and the kernel debugging stub is implanted into an operating system of the target machine in advance.

With reference to any one of the third aspect, or the first implementation manner of the third aspect to the third implementation manner of the third aspect, in a fourth implementation manner of the third aspect, if the preset event is the kernel module unloading function, the operation object of the preset event is a kernel module;

if the preset event is the process deletion function, the operation object of the preset event is a process; and if the preset event is the thread deletion function, the operation object of the preset event is a thread.

With reference to any one of the third aspect, or the first implementation manner of the third aspect to the fourth implementation manner of the third aspect, in a fifth implementation manner of the third aspect, the debugging information of the preset event includes an identifier of the operation object of the preset event.

With reference to any one of the third aspect, or the first implementation manner of the third aspect to the fifth implementation manner of the third aspect, in a sixth implementation manner of the third aspect, the multi-core processor is integrated into a system on chip SOC;

the core A is specifically configured to send the running stop signal to the other cores by using a hardware cross-trigger network of the SOC, where the running stop signal is used to instruct the other cores to stop running; and the core A is specifically configured to send the running resumption instruction to the other cores by using the hardware cross-trigger network of the SOC, where the running resumption instruction is used to instruct the other cores to resume running.

According to a fourth aspect, an embodiment of the present invention provides a debugging apparatus, where the debugging apparatus is deployed in a host machine in a remote debugging system, and the debugging device includes a debugging unit and a receiving unit, where the receiving unit is configured to: receive a message used for instructing a core A to stop running, and forward the message used for instructing the core A to stop running to the debugging unit, where a target machine located in the remote debugging system includes a multi-core processor, and the multi-core processor includes the core A;

the debugging unit is configured to: after determining that the core A stops running, determine a reason that the core A stops running;

if the reason that the core A stops running is a preset event, the debugging apparatus is further configured to: obtain debugging information of the preset event, and mask an operation object of the preset event according to the debugging information of the preset event, where the preset event is a kernel module unloading function, a process deletion function, or a thread deletion function, and the operation object of the preset event is a kernel module, a process, or a thread; and the debugging apparatus is further configured to instruct the core A to resume running.

With reference to the fourth aspect, in a first implementation manner of the fourth aspect, if the reason that the core A stops running is a reason other than the preset event, the debugging apparatus is further configured to instruct the core A to resume running, to collect the debugging information of the preset event.

With reference to the fourth aspect or the first implementation manner of the fourth aspect, in a second implementation manner of the fourth aspect, the debugging information of the preset event includes an identifier of the operation object of the preset event; and the debugging apparatus is specifically configured to: obtain the identifier of the operation object of the preset event, and mask the operation object of the preset event according to the identifier of the operation object of the preset event.

With reference to the fourth aspect, the first implementation manner of the fourth aspect, or the second implementation manner of the fourth aspect, in a third implementation manner of the fourth aspect, if the preset event is the kernel module unloading function, the operation object of the preset event is a kernel module;

if the preset event is the process deletion function, the operation object of the preset event is a process; and if the preset event is the thread deletion function, the operation object of the preset event is a thread.

With reference to any one of the fourth aspect, or the first implementation manner of the fourth aspect to the third implementation manner of the fourth aspect, in a fourth implementation manner of the fourth aspect, the debugging apparatus includes a debugger and a debugging agent;

the debugging agent is specifically configured to: after determining that the core A stops running, determine the reason that the core A stops running, and if the reason that the core A stops running is the preset event, report a second message to the debugger, where the second message includes an identifier indicating that the core A stops running and an identifier of the preset event;

the debugger is specifically configured to: after receiving the second message, obtain the debugging information of the preset event, and mask the operation object of the preset event according to the debugging information of the preset event; and the debugger is specifically configured to instruct the debugging agent to send a second stop termination instruction to the core A, where the second stop termination instruction is used to instruct the core A to resume running.

With reference to the fourth implementation manner of the fourth aspect, in a fifth implementation manner of the fourth aspect, the debugging agent is specifically configured to: after determining that the core A stops running, determine the reason that the core A stops running, and if the reason that the core A stops running is a reason other than the preset event, send a first stop termination instruction to the core A, where the first stop termination instruction is used to instruct the core A to resume running, to collect the debugging information of the preset event.

With reference to any one of the fourth aspect, or the first implementation manner of the fourth aspect to the fourth implementation manner of the fourth aspect, in a sixth implementation manner of the fourth aspect, the debugging apparatus includes the debugger and the debugging agent;

the debugging agent is specifically configured to: after determining that the core A stops running, determine the reason that the core A stops running, and if the reason that the core A stops running is a reason other than the preset event, report a first message to the debugger, where the first message includes the identifier indicating that the core A stops running and a default identifier; and the debugger is specifically configured to: after receiving the first message, instruct the debugging agent to send a first stop termination instruction to the core A, where the first stop termination instruction is used to instruct the core A to resume running, to collect the debugging information of the preset event.

According to a fifth aspect, an embodiment of the present invention provides a debugging device, including a processor and a memory;

the processor is configured to: after determining that the core A stops running, determine a reason that the core A stops running, where a target machine located in the remote debugging system includes a multi-core processor, and the multi-core processor includes the core A;

if the reason that the core A stops running is a preset event, the processor is configured to: obtain debugging information of the preset event, and mask an operation object of the preset event according to the debugging information of the preset event, where the preset event is a kernel module unloading function, a process deletion function, or a thread deletion function, and the operation object of the preset event is a kernel module, a process, or a thread;

the memory is configured to store the debugging information of the preset event; and the processor is further configured to instruct the core A to resume running.

With reference to the fifth aspect, in a first implementation manner of the fifth aspect, if the reason that the core A stops running is a reason other than the preset event, the processor is further configured to instruct the core A to resume running, to collect the debugging information of the preset event.

With reference to the fifth aspect or the first implementation manner of the fifth aspect, in a second implementation manner of the fifth aspect, the debugging information of the preset event includes an identifier of the operation object of the preset event; and the processor is specifically configured to: obtain the identifier of the operation object of the preset event, and mask the operation object of the preset event according to the identifier of the operation object of the preset event.

With reference to the fifth aspect, the first implementation manner of the fifth aspect, or the second implementation manner of the fifth aspect, in a third implementation manner of the fifth aspect, if the preset event is the kernel module unloading function, the operation object of the preset event is a kernel module;

if the preset event is the process deletion function, the operation object of the preset event is a process; and if the preset event is the thread deletion function, the operation object of the preset event is a thread.

It can be learned that according to the debugging method provided in the embodiments of the present invention, a debugging interface function is added to a trailer of a preset event that runs on a core A. The debugging interface function invokes a function that is associated with a type of the preset event and that is in a kernel debugging stub, to obtain debugging information of the preset event. A debugger masks an operation object of the preset event according to the debugging information of the preset event. In the embodiments of the present invention, the preset event is a kernel module unloading function, a process deletion function, or a thread deletion function, the operation object of the preset event is a kernel module, a process, or a thread, the kernel module is kernel mode code, and the process and the thread are user mode code. Therefore, by means of the technical solution provided in the embodiments of the present invention, the kernel mode code and the user mode code can be masked on a same debugging platform.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 5 is a schematic structural diagram of a target machine according to an embodiment of the present invention;

FIG. 6.1 is a schematic structural diagram of a data header and a data body according to an embodiment of the present invention;

FIG. 6.2 is another schematic structural diagram of a data header and a data body according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiment 1

Figure 1:
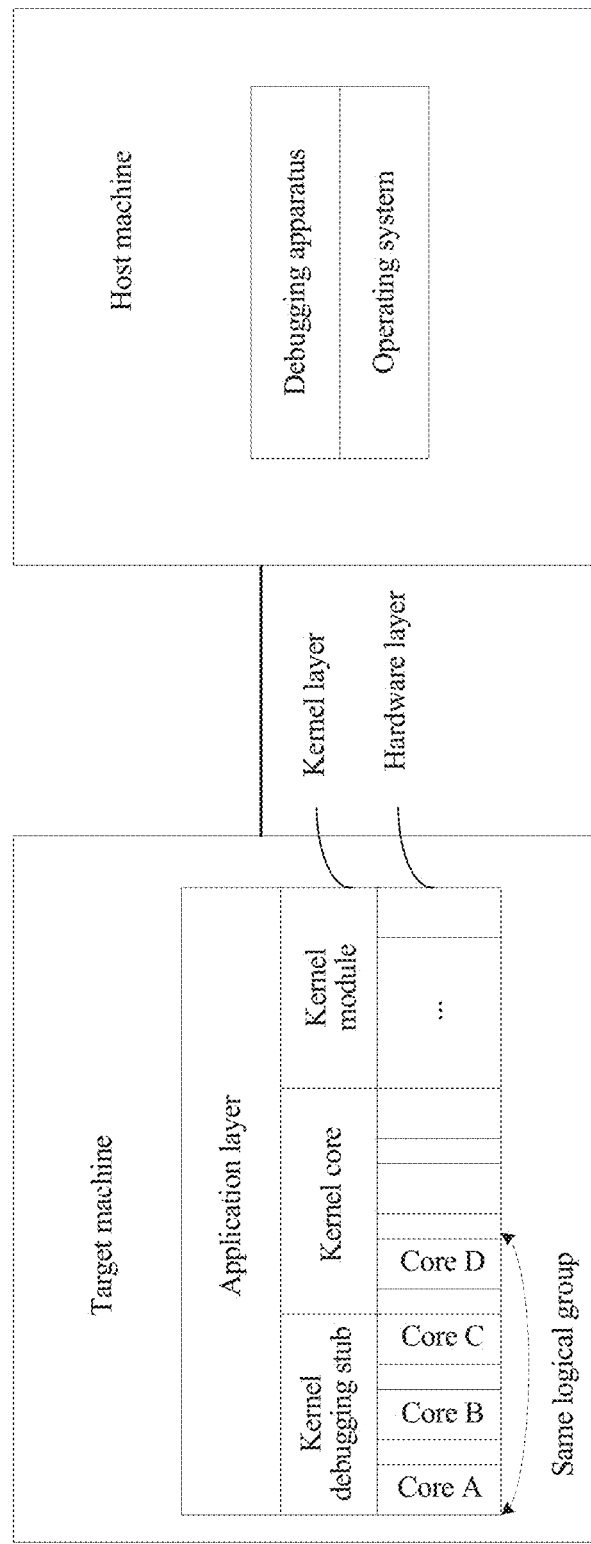
FIG. 1 is a schematic structural diagram of a remote debugging system according to an embodiment of the present invention.
Figure 3:
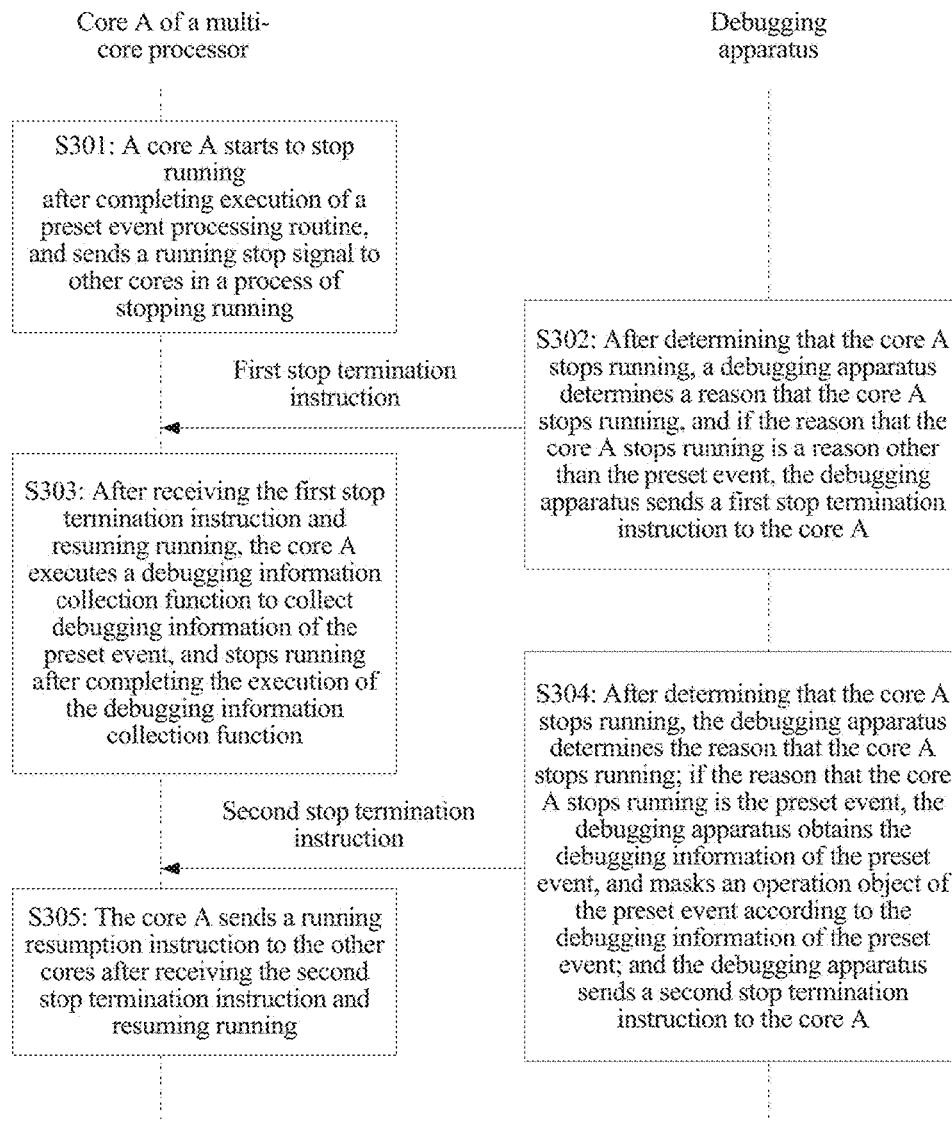
FIG. 3 is a schematic flowchart of a debugging method according to an embodiment of the present invention.

Referring to FIG. 3, this embodiment of the present invention provides a debugging method applied to a remote debugging system shown in FIG. 1. Referring to FIG. 1, the remote debugging system includes a target machine and a host machine, the target machine includes a multi-core processor, and a debugging apparatus is deployed in the host machine. The target machine and the host machine are different physical hosts, and the target machine is in communication connection with the host machine. It should be noted that, in the technical solution provided in this embodiment of the present invention, the multi-core processor may be a homogeneous multi-core processor, or may be a heterogeneous multi-core processor. If the target machine includes multiple multi-core processors, a core A may be any core of any multi-core processor in the target machine, instead of a specified core of a specified multi-core processor in the target machine.

Specifically, the debugging method provided in this embodiment of the present invention includes the following steps.

S301. The core A starts to stop running after completing execution of a preset event processing routine, and sends a running stop signal to other cores in a process of stopping running, where the running stop signal is used to instruct the other cores to stop running, the other cores refer to all cores that are located in the multi-core processor and that belong to a same logical group as the core A, and the preset event is a kernel module unloading function, a process deletion function, or a thread deletion function.

As shown in FIG. 5, in this embodiment of the present invention, a debugging interface function is added to a trailer of the preset event. The debugging interface function is located outside the preset event, and is not a part of the preset event. A first debugging exception instruction is set in a header of the debugging interface function, and the core A stops running after completing execution of the first debugging exception instruction. A second debugging exception instruction is further set in a trailer of the debugging interface function, and the core A stops running after completing execution of the second debugging exception instruction.

Specifically, that the core A starts to stop running after completing execution of a preset event processing routine, and sends a running stop signal to other cores in a process of stopping running includes: After completing the execution of the preset event processing routine, the core A starts to execute the first debugging exception instruction located in the header of the debugging interface function, and sends the running stop signal to the other cores in a process of executing the first debugging exception instruction. It should be noted that, the core A executes the first debugging exception instruction for a period of time. The core A starts to execute the first debugging exception instruction, then sends the running stop signal to the other cores at a moment before the execution of the first debugging exception instruction is completed, and continues to execute the first debugging exception instruction after sending the running stop signal to the other cores. The core A stops running after completing the execution of the first debugging exception instruction.

It should be noted that, all cores included in a same logical group are located in a same multi-core processor. Logical grouping means that multiple cores in a service association relationship are classified into a same logical group by a debugging engineer according to experience. As shown in FIG. 1, the core A, a core B, a core C, and a core D are located in a same logical group. In this case, that the core A sends a running stop signal to other cores is specifically: The core A sends the running stop signal to the core B, the core C, and the core D.

In an embodiment of the present invention, if the target machine includes a system on chip SOC, and the multi-core processor including the core A is integrated into the SOC, that the core A sends a running stop signal to other cores, where the running stop signal is used to instruct the other cores to stop running is specifically: The core A sends the running stop signal to the other cores by using a hardware cross-trigger network of the SOC, where the running stop signal is used to instruct the other cores to stop running. It should be noted that, when sending a running resumption instruction to the other cores by using the hardware cross-trigger network of the SOC, the core A sends the running resumption instruction in a broadcast manner. An advantage of transmitting a signal by using the hardware cross-trigger network of the system on chip SOC lies in: Compared with transmitting a signal by using software, transmitting a signal by using hardware can improve time validity of transmission of the running stop signal.

It is easily learned that regardless of multiple processes or multiple threads that run on a heterogeneous multi-core processor in an asymmetric multi-processing (AMP, asymmetric multi-processing) structure, or multiple processes or multiple threads that run on a homogeneous multi-core processor in a symmetric multi-processing (SMP, symmetric multi-processing) structure, synchronous debugging can be implemented by using the technical solution provided in this embodiment of the present invention.

S302. After determining that the core A stops running, the debugging apparatus determines a reason that the core A stops running, and if the reason that the core A stops running is a reason other than the preset event, the debugging apparatus sends a first stop termination instruction to the core A, where the first stop termination instruction is used to instruct the core A to resume running.

It should be noted that, in step S301, the core A starts to stop running after completing the execution of the preset event processing routine, and instructs the other cores to stop running; in step S302, the debugging apparatus sends the first stop termination instruction to the core A. Such a solution is designed to implement synchronous debugging. Referring to FIG. 1, the core A, the core B, the core C, and the core D are located in the same logical group. Data exchange is performed between code that runs on at least one core (such as the core B) of the core B, the core C, or the core D and code that runs on the core A. In this case, during debugging of the core A, if the core B continues to run, distortion may occur because data exchange cannot be correctly performed between the code that runs on the core B and the code that runs on the core A. Therefore, in the solution provided in this embodiment of the present invention, during debugging of the core A, the other cores that belong to the same logical group as the core A stop running, to avoid distortion. Further, the core A and the other cores first stop running synchronously, and then the core A resumes running for debugging. In addition, in order that the core A and the other cores stop running synchronously, a time at which the running stop signal sent by the core A is transmitted to the other cores and a time at which the core A stops running are further fully considered in design of the solution. Specifically, after starting to stop running, the core A sends a running stop instruction to the other cores in a period of stopping running, so that the core A and the other cores stop running synchronously, and relatively precise synchronous debugging is further implemented.

It should be noted that, there is preset storage space in a memory of the target machine, the preset storage space is specified by a debugging engineer in the memory of the target machine in advance, and both a size and an address of the preset storage space are fixed. The preset storage space is used to store a data header. Initially, the data header includes first default information and an address of a data body, and certainly, the first default information may be empty. The data body includes second default information, and certainly, the second default information may also be empty.

As shown in FIG. 6.1, if the core A stops running after completing the execution of the preset event operation routine, the data header still includes the first default information and a location of the data body, and content of the data body is the second default information. Correspondingly, if the core A stops running after completing the execution of the preset event operation routine, that after determining that the core A stops running, the debugging apparatus determines a reason that the core A stops running in S302 specifically includes: After determining, in a polling manner, that the core A stops running, the debugging apparatus determines, by reading content of the data header, the reason that the core A stops running; and because the content of the data header includes the first default information, the debugging apparatus can determine, according to the first default information, that the reason that the core A stops running is a reason other than the preset event.

Figure 2:
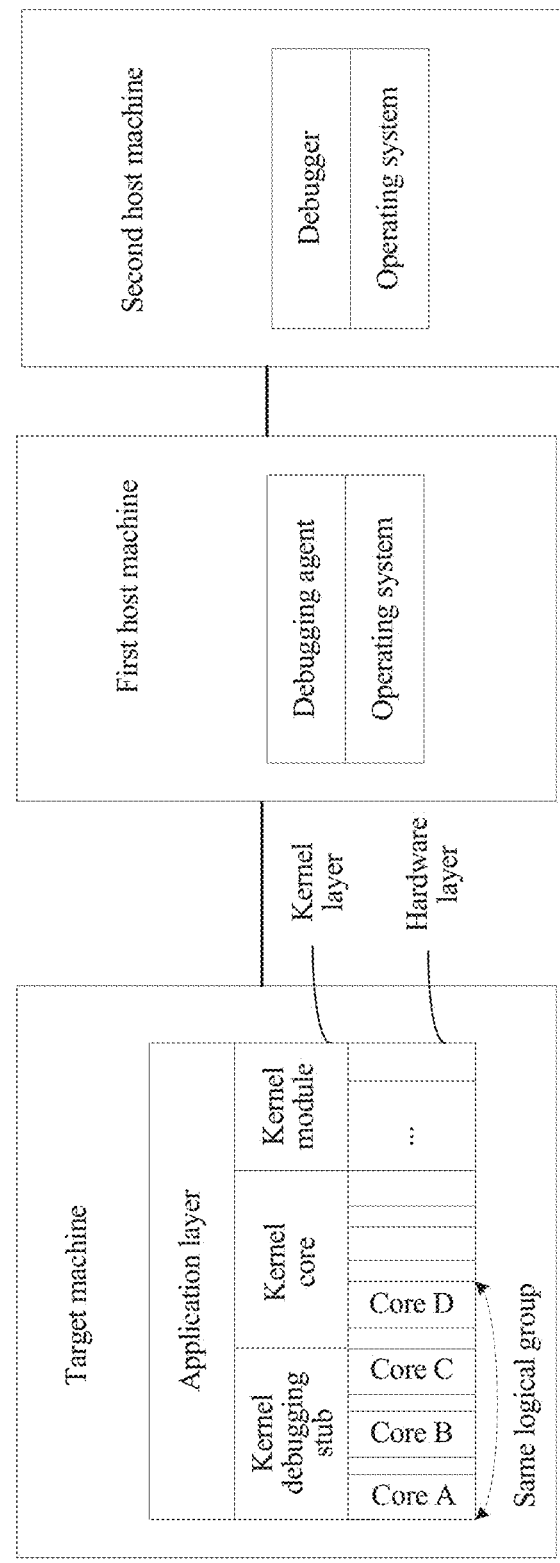
FIG. 2 is a schematic structural diagram of another remote debugging system according to an embodiment of the present invention.
Figure 4A:
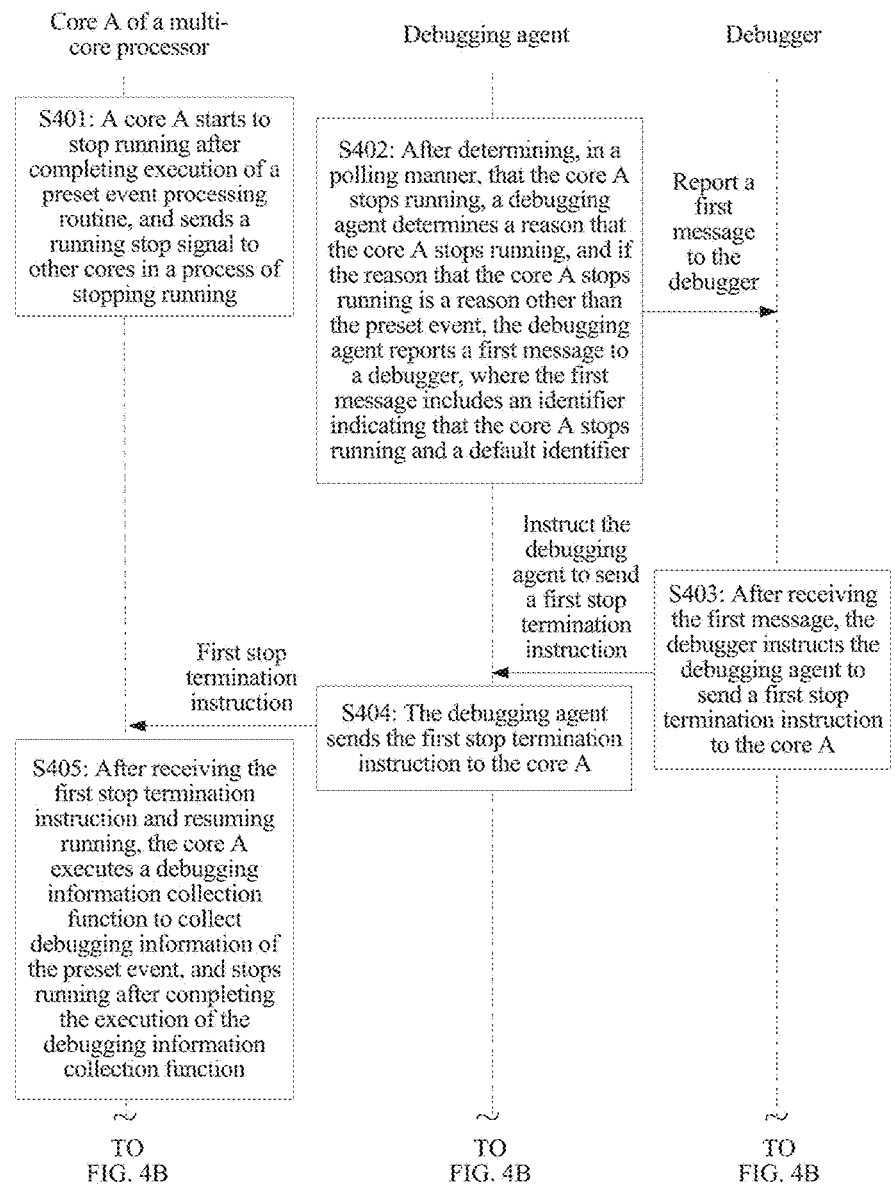
FIG. 4A and FIG. 4B is a schematic flowchart of another debugging method according to an embodiment of the present invention.
Figure 4B:
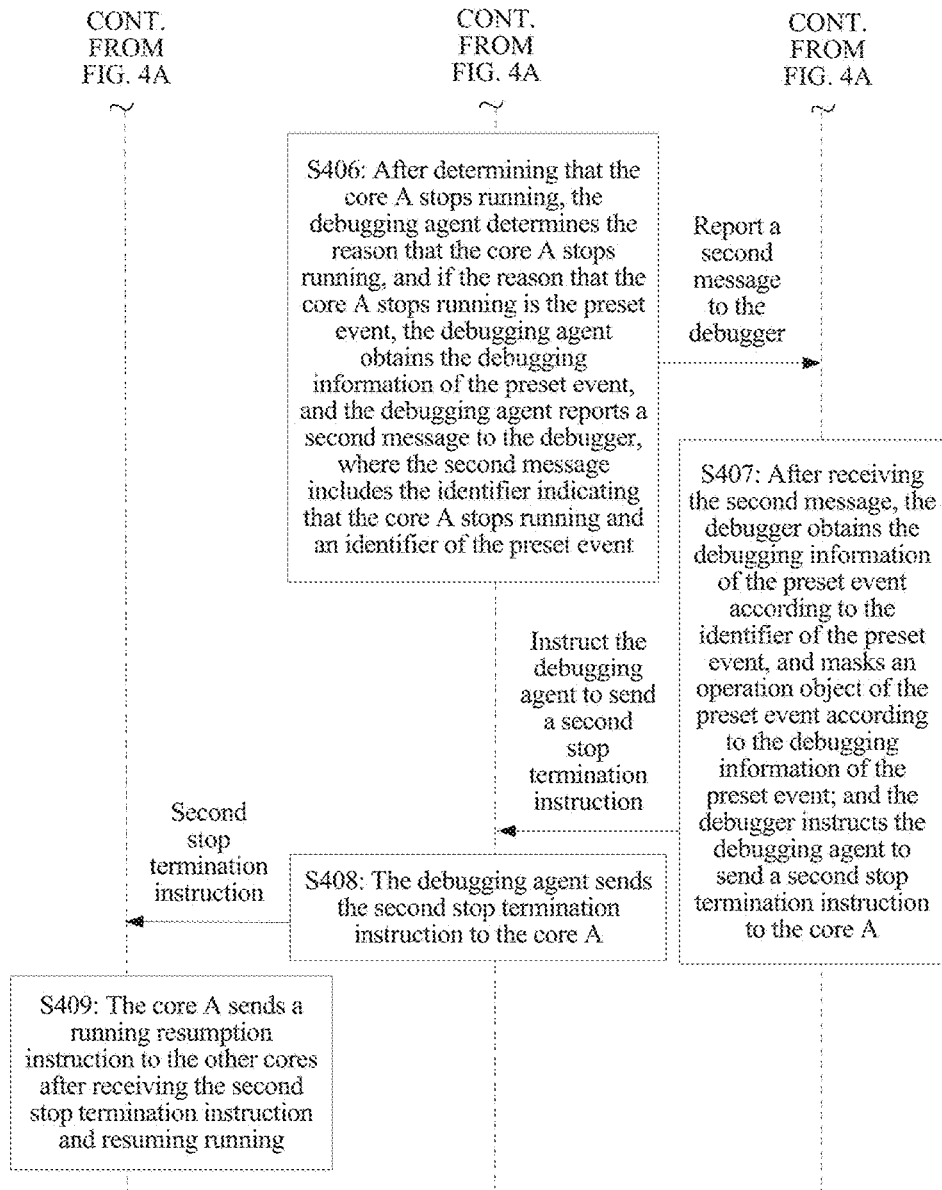

Referring to FIG. 4A and FIG. 4B, in an embodiment of the present invention, the debugging apparatus includes a debugging agent and a debugger, and the debugging apparatus is applied to the remote debugging system described in FIG. 2. It should be noted that, the debugging agent and the debugger may be located in a same host machine, or may be located in different host machines. For example, in FIG. 2, the debugging agent is located in a first host machine, and the debugger is located in a second host machine. As shown in FIG. 4A, if the debugging apparatus includes the debugging agent and the debugger, S302 in FIG. 3 specifically includes the following steps.

S402. After determining, in a polling manner, that the core A stops running, the debugging agent determines the reason that the core A stops running, and if the reason that the core A stops running is a reason other than the preset event, the debugging agent reports a first message to the debugger, where the first message includes an identifier indicating that the core A stops running and a default identifier.

With reference to the content explained in detail above, if the core A stops running after completing the execution of the preset event operation routine, it can be learned that S402 specifically includes: After determining, in a polling manner, that the core A stops running, the debugging agent determines, by reading the content of the data header, the reason that the core A stops running; and because the content of the data header includes the first default information, the debugging agent can determine, according to the first default information, that the reason that the core A stops running is a reason other than the preset event, and report, to the debugger, the first message including the identifier indicating that the core A stops running and the default identifier.

S403. After receiving the first message, the debugger instructs the debugging agent to send the first stop termination instruction to the core A, where the first stop termination instruction is used to instruct the core A to resume running.

S404. The debugging agent sends the first stop termination instruction to the core A.

In an embodiment of the present invention, if the debugging apparatus includes the debugging agent and the debugger, S302 in FIG. 3 specifically includes:

After determining, in a polling manner, that the core A stops running, the debugging agent determines the reason that the core A stops running, and if the reason that the core A stops running is a reason other than the preset event, the debugging agent sends the first stop termination instruction to the core A. The first stop termination instruction is used to instruct the core A to resume running.

For details, refer to the foregoing explanation of step S402 above. Details are not repeatedly described herein. It should be noted that, in this embodiment of the present invention, the debugging agent no longer reports, to the debugger, the first message including the identifier indicating that the core A stops running and the default identifier. Instead, the debugging agent sends the first stop termination instruction to the core A after reading the first default information from the data header and determining that the reason that the core A stops running is a reason other than the preset event. A difference between this embodiment and the foregoing embodiment lies in; The debugging agent sends the first stop termination instruction to the core A because the debugging agent determines that the reason that the core A stops running is a reason other than the preset event, instead of receiving an instruction of the debugger. Compared with the foregoing embodiment, the debuger agent shares more work of the debugger in this embodiment. Therefore, fewer function requirements are imposed on the debugger, which helps to simplify the debugger.

S303. After receiving the first stop termination instruction and resuming running, the core A executes a debugging information collection function to collect debugging information of the preset event, and stops running after completing the execution of the debugging information collection function.

Referring to FIG. 5, it should be noted that, the debugging information collection function includes the debugging interface function added to the trailer of the preset event and a function associated with the preset event. The function associated with the preset event is located in a kernel debugging stub, and the kernel debugging stub is implanted into an operating system of the target machine in advance.

As described for S301 in detail above, the first debugging exception instruction is set in the header of the debugging interface function, and the second debugging exception instruction is set in the trailer of the debugging interface function. In a process of executing the debugging interface function, the function that is associated with the preset event and is located in the kernel debugging stub is invoked.

Specifically, S303 includes: The core A executes the function associated with the preset event to collect the debugging information of the preset event, and then executes the second debugging exception instruction located in the trailer of the debugging interface function. The core A stops running after the core A completes the execution of the second debugging exception instruction.

It should be noted that, the debugging information of the preset event includes an identifier of the preset event and an identifier of an operation object of the preset event. It can be learned that an information amount of the debugging information of the preset event is relatively small, and is generally only about 100 rows. Therefore, according to the technical solution provided in this embodiment of the present invention, an amount of data to be processed by a processor of a target machine can be reduced, thereby improving debugging efficiency.

S304. After determining that the core A stops running, the debugging apparatus determines the reason that the core A stops running, and if the reason that the core A stops running is the preset event, the debugging apparatus obtains the debugging information of the preset event, and masks an operation object of the preset event according to the debugging information of the preset event, where the operation object of the preset event is a kernel module, a process, or a thread.

The debugging apparatus sends a second stop termination instruction to the core A. The second stop termination instruction is used to instruct the core A to resume running.

It should be noted that, if the preset event is the kernel module unloading function, the process deletion function, or the thread deletion function, the debugging apparatus masks the operation object of the preset event to prevent a debugging engineer from debugging the operation object of the preset event again subsequently. This is a specific debugging form, and is also a debugging method.

As shown in FIG. 6.2, it should be noted that, if the core A stops running after completing the execution of the debugging information collection function, in a process of executing the debugging information collection function, the core A writes, into the data header to replace default information, an identifier that is of the preset event and is used for triggering the core A to execute the debugging information collection function, and writes the identifier of the operation object of the preset event into the data body. It is easily understood that, if the preset event is the kernel module unloading function, the process deletion function, or the thread deletion function, the debugging information collection function includes the identifier of the preset event and the identifier of the operation object of the preset event.

Correspondingly, if the core A stops running after completing the execution of the debugging information collection function, that after determining that the core A stops running, the debugging apparatus determines the reason that the core A stops running in S304 specifically includes: After determining, in a polling manner, that the core A stops running, the debugging apparatus determines, by reading the content of the data header, the reason that the core A stops running; and because the content of the data header includes the identifier of the preset event, the debugging apparatus can determine, according to the identifier of the preset event, that the reason that the core A stops running is the preset event.

It should be noted that, that the debugging apparatus obtains the debugging information of the preset event, and sets a preset pending breakpoint as an operation object of the preset event according to the debugging information of the preset event in S304 specifically includes:

The debugging apparatus reads, from the data body, the identifier of the operation object of the preset event according to the address of the data body located in the data header, and then masks the operation object of the preset event according to the identifier of the operation object of the preset event.

With reference to FIGS. 6.1 and 6.2, it can be learned that in the technical solution provided in this embodiment of the present invention, if the preset event is the kernel module unloading function, the process deletion function, or the thread deletion function, and the core A stops running after completing the execution of the debugging information collection function, content of the data header and the data body is shown in FIG. 6.2. If the core A stops running due to another event, content of the data header and the data body is shown in FIG. 6.1. Certainly, a case in which the execution of the debugging information collection function is completed is excluded from the another event. That is, the data header and the data body include only one message. When obtaining information from the data header, the debugging apparatus does not need to distinguish which is target information. In addition, because the data header and the data body include only one message, the size of the preset storage space in the memory of the target machine is fixed, and space occupied by the preset storage is extremely small, thereby avoiding occupying excessive storage resources of the target machine, and improving efficiency of obtaining information.

It should be noted that, if the preset event is the kernel module unloading function, the operation object of the preset event is a kernel module. If the preset event is the process deletion function, the operation object of the preset event is a process. If the preset event is the thread deletion function, the operation object of the preset event is a thread. The kernel module may be a dynamic patch, a hot patch, a dynamic library, or the like.

Referring to FIG. 4A and FIG. 4B. In another embodiment of the present invention, the debugging apparatus includes a debugging agent and a debugger, and the debugging apparatus is applied to the remote debugging system described in FIG. 2. It should be noted that, the debugging agent and the debugger may be located in a same host machine, or may be located in different host machines. For example, in FIG. 2, the debugging agent is located in a first host machine, and the debugger is located in a second host machine. As shown in FIG. 4B, if the debugging apparatus includes the debugging agent and the debugger, S304 in FIG. 3 specifically includes the following steps.

S406. After determining that the core A stops running, the debugging agent determines the reason that the core A stops running, and if the reason that the core A stops running is the preset event, the debugging agent reports a second message to the debugger, where the second message includes the identifier indicating that the core A stops running and an identifier of the preset event.

It should be noted that, if the core A stops running after completing the execution of the debugging information collection function, S406 specifically includes: After determining, in a polling manner, that the core A stops running, the debugging agent determines, by reading the content of the data header, the reason that the core A stops running; and because the content of the data header includes the identifier of the preset event, the debugging agent can determine, according to the identifier of the preset event, that the reason that the core A stops running is the preset event, and report, to the debugger, the second message including the identifier indicating that the core A stops running and the identifier of the preset event.

S407. After receiving the second message, the debugger obtains the debugging information of the preset event, and masks the operation object of the preset event according to the debugging information of the preset event.

The debugger instructs the debugging agent to send the second stop termination instruction to the core A. The second stop termination instruction is used to instruct the core A to resume running.

It should be noted that, that the debugger obtains the debugging information of the preset event, and masks an operation object of the preset event according to the debugging information of the preset event specifically includes: The debugger reads, from the data body, the identifier of the operation object of the preset event according to the address of the data body located in the data header, and then masks the operation object of the preset event according to the identifier of the operation object of the preset event.

In this embodiment of the present invention, that "the debugger instructs the debugging agent to send the second stop termination instruction" occurs after "the debugger masks the operation object of the preset event". In another embodiment of the present invention, that "the debugger instructs the debugging agent to send the second stop termination instruction" may occur at any moment after "the debugger obtains the identifier of the operation object of the preset event" and before "the debugger masks the operation object of the preset event".

S408. The debugging agent sends a second stop termination instruction to the core A.

S305. The core A sends a running resumption instruction to the other cores after receiving the second stop termination instruction and resuming running, where the running resumption instruction is used to instruct the other cores to resume running.

As explained for S301 above, if the target machine includes the system on chip SOC, and the multi-core processor including the core A is integrated into the SOC, that the core A sends a running resumption instruction to the other cores, where the running resumption instruction is used to instruct the other cores to resume running is specifically: The core A sends the running resumption instruction to the other cores by using the hardware cross-trigger network of the SOC, where the running resumption instruction is used to instruct the other cores to resume running. It should be noted that, when sending the running resumption instruction to the other cores by using the hardware cross-trigger network of the SOC, the core A sends the running resumption instruction in a broadcast manner. Similarly, an advantage of transmitting a signal by using the hardware cross-trigger network of the SOC lies in that time validity of transmission of the running resumption instruction can be improved.

It can be learned from above that, according to the debugging method provided in this embodiment of the present invention, a debugging interface function is added to a trailer of a preset event that runs on a core A. The debugging interface function invokes a function that is associated with a type of the preset event and that is in a kernel debugging stub, to obtain debugging information of the preset event. A debugger masks an operation object of the preset event according to the debugging information of the preset event. In this embodiment of the present invention, the preset event is a kernel mode code processing function or a user mode code processing function. Therefore, by means of the technical solution provided in this embodiment of the present invention, kernel mode code and user mode code can be masked on a same debugging platform.

Embodiment 2

Figure 7:
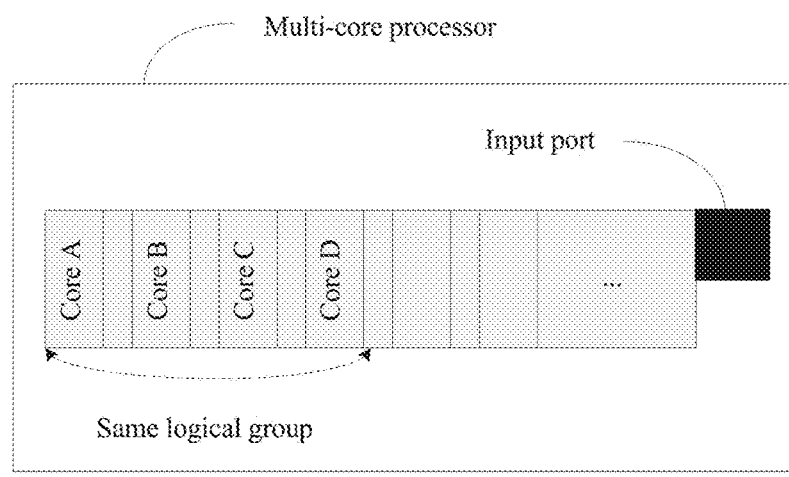
FIG. 7 is a schematic structural diagram of a multi-core processor according to an embodiment of the present invention.

Referring to FIG. 7, this embodiment of the present invention includes a multi-core processor applied to the debugging method described in Embodiment 1, and the multi-core processor is deployed in a target machine in a remote debugging system shown in FIG. 1. As shown in FIG. 7, the multi-core processor includes a core A, an input port, and other cores. The other cores include a core B, a core C, and a core D. The core B, the core C, and the core D and the core A all are located in the multi-core processor and belong to a same logical group.

The core A is configured to: start to stop running after completing execution of a preset event processing routine, and send a running stop signal to the other cores in a process of stopping running. The running stop signal is used to instruct the other cores to stop running, and the preset event is a kernel module unloading function, a process deletion function, or a thread deletion function.

As shown in FIG. 5, in this embodiment of the present invention, a debugging interface function is added to a trailer of the preset event. The debugging interface function is located outside the preset event, and is not a part of the preset event. A first debugging exception instruction is set in a header of the debugging interface function, and the core A stops running after completing execution of the first debugging exception instruction. Therefore, the core A is specifically configured to: after completing the execution of the preset event processing routine, start to execute the first debugging exception instruction located in the header of the debugging interface function, and send the running stop signal to the other cores in a process of executing the first debugging exception instruction.

In an embodiment of the present invention, if the target machine includes a system on chip SOC, and the multi-core processor including the core A is integrated into the SOC, the core A is specifically configured to send the running stop signal to the other cores by using a hardware cross-trigger network of the SOC. The running stop signal is used to instruct the other cores to stop running. It should be noted that, when sending a running resumption instruction to the other cores by using the hardware cross-trigger network of the SOC, the core A sends the running resumption instruction in a broadcast manner. An advantage of transmitting a signal by using the hardware cross-trigger network of the system on chip SOC lies in that time validity of transmission of the running stop signal is improved.

It is easily learned that regardless of multiple processes or multiple threads that run on a heterogeneous multi-core processor in an asymmetric multi-processing (AMP, asymmetric multi-processing) structure, or multiple processes or multiple threads that run on a homogeneous multi-core processor in a symmetric multi-processing (SMP, symmetric multi-processing) structure, synchronous debugging can be implemented by using the multi-core processor provided in this embodiment of the present invention.

Referring to FIG. 7, the core A, the core B, the core C, and the core D are located in the same logical group. Data exchange is performed between code that runs on at least one core (such as the core B) of the core B, the core C, or the core D and code that rims on the core A. In this case, during debugging of the core A, if the core B continues to run, distortion may occur because data exchange cannot be correctly performed between the code that runs on the core B and the code that runs on the core A. Therefore, in the solution provided in this embodiment of the present invention, during debugging of the core A, the other cores that belong to the same logical group as the core A stop running, to avoid distortion. Further, the core A and the other cores first stop running synchronously, and then the core A resumes running for debugging. In addition, in order that the core A and the other cores stop running synchronously, a time at which the running stop signal sent by the core A is transmitted to the other cores and a time at which the core A stops running are further fully considered in design of the solution. Specifically, after starting to stop running, the core A sends a running stop instruction to the other cores in a period of stopping running, so that the core A and the other cores stop running synchronously, and relatively precise synchronous debugging is further implemented.

The input port is configured to: receive a first stop termination instruction, and forward the first stop termination instruction to the core A. The first stop termination instruction is sent by a debugging apparatus in the remote debugging system after the debugging apparatus determines that the core A stops running and that a reason that the core A stops running is a reason other than the preset event.

The core A is further configured to: after receiving the first stop termination instruction and resuming running, execute a debugging information collection function to collect debugging information of the preset event, and stop running after completing the execution of the debugging information collection function.

Referring to FIG. 5, it should be noted that, the debugging information collection function includes the debugging interface function added to the trailer of the preset event and a function associated with the preset event. The function associated with the preset event is located in a kernel debugging stub, and the kernel debugging stub is implanted into an operating system of the target machine in advance.

A second debugging exception instruction is set in a trailer of the debugging interface function. In a process of executing the debugging interface function, the function that is associated with the preset event and is located in the kernel debugging stub is invoked.

It should be rioted that, the core A is specifically configured to: execute the function associated with the preset event to collect the debugging information of the preset event, and then execute the second debugging exception instruction located in the trailer of the debugging interface function. The core A stops running after the core A completes the execution of the second debugging exception instruction.

It should be noted that, the debugging information of the preset event includes an identifier of the preset event and an identifier of an operation object of the preset event. It can be learned that an information amount of the debugging information of the preset event is relatively small, and is generally only about 100 rows. Therefore, according to the technical solution provided in this embodiment of the present invention, an amount of data to be processed by a processor of a target machine can be reduced, thereby improving debugging efficiency.

The input port is further configured to: receive a second stop termination instruction, and forward the second stop termination instruction to the core A. The second stop termination instruction is sent by the debugging apparatus after the debugging apparatus masks the operation object of the preset event according to the debugging information of the preset event, and the operation object of the preset event is a kernel module, a process, or a thread.

It should be noted that, if the preset event is the kernel module unloading function, the operation object of the preset event is a kernel module. If the preset event is the process deletion function, the operation object of the preset event is a process. If the preset event is the thread deletion function, the operation object of the preset event is a thread. The kernel module may be a dynamic patch, a hot patch, a dynamic library, or the like.

The core A is further configured to send a running resumption instruction to the other cores after receiving the second stop termination instruction and resuming running. The running resumption instruction is used to instruct the other cores to resume running.

As described above, if the target machine includes the system on chip SOC, and the multi-core processor including the core A is integrated into the SOC, the core A is specifically configured to send the running resumption instruction to the other cores by using the hardware cross-trigger network of the SOC. The running resumption instruction is used to instruct the other cores to resume running. It should be noted that, when sending the running resumption instruction to the other cores by using the hardware cross-trigger network of the SOC, the core A sends the running resumption instruction in a broadcast manner. Similarly, an advantage of transmitting a signal by using the hardware cross-trigger network of the SOC lies in that time validity of transmission of the running resumption instruction can be improved.

It can be learned from above that, according to the multi-core processor provided in this embodiment of the present invention, a debugging interface function is added to a trailer of a preset event that runs on a core A. The debugging interface function invokes a function that is associated with a type of the preset event and that is in a kernel debugging stub, to obtain debugging information of the preset event. Therefore, a debugging apparatus masks an operation object of the preset event according to the debugging information of the preset event. In this embodiment of the present invention, the preset event is a kernel module unloading function, a process deletion function, or a thread deletion function, the operation object of the preset event is a kernel module, a process, or a thread, the kernel module is kernel mode code, and the process and the thread are user mode code. Therefore, by means of the multi-core processor provided in this embodiment of the present invention, the kernel mode code and the user mode code can be masked on a same debugging platform.

Embodiment 3

Figure 8:
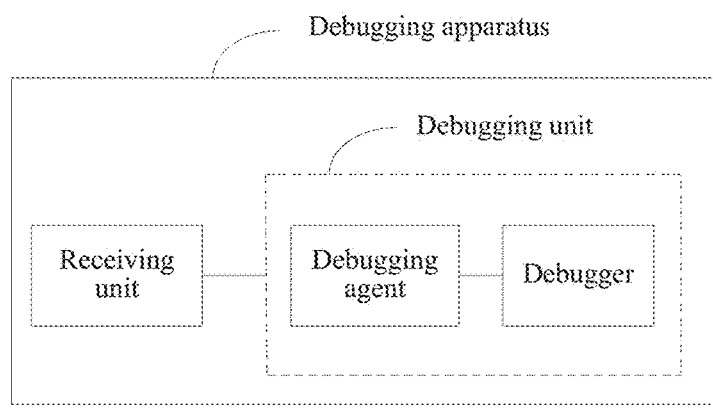
FIG. 8 is a schematic structural diagram of a debugging apparatus according to an embodiment of the present invention.

Referring to FIG. 8, this embodiment of the present invention includes a debugging apparatus applied to the debugging method described in Embodiment 1, and the debugging apparatus is deployed in a host machine in the remote debugging system shown in FIG. 1. As shown in FIG. 8, the debugging apparatus includes a debugging unit and a receiving unit.

The receiving unit is configured to: receive a message used for instructing a core A to stop running, and forward the message used for instructing the core A to stop running to the debugging apparatus. A target machine located in the remote debugging system includes a multi-core processor, and the multi-core processor includes the core A.

The debugging unit is configured to: after determining that the core A stops running, determine a reason that the core A stops running.

If the reason that the core A stops running is a preset event, the debugging unit is further configured to: obtain debugging information of the preset event, and mask an operation object of the preset event according to the debugging information of the preset event. The preset event is a kernel module unloading function, a process deletion function, a thread deletion function, or a user mode code processing function, and the operation object of the preset event is a kernel module, a process, or a thread.

The debugging unit is further configured to instruct the core A to resume running.

It should be noted that, if the preset event is the kernel module unloading function, the operation object of the preset event is a kernel module. If the preset event is the process deletion function, the operation object of the preset event is a process. If the preset event is the thread deletion function, the operation object of the preset event is a thread. The kernel module may be a dynamic patch, a hot patch, a dynamic library, or the like.

It should be noted that, there is preset storage space in a memory of the target machine, the preset storage space is specified by a debugging engineer in the memory of the target machine in advance, and both a size and an address of the preset storage space are fixed. The preset storage space is used to store a data header. Initially, the data header includes first default information and an address of a data body, and certainly, the first default information may be empty. The data body includes second default information, and certainly, the second default information may also be empty.

As shown in FIG. 6.2, if the preset event is the kernel module unloading function, the process deletion function, or the thread deletion function, and the core A stops running after completing execution of the debugging information collection function, in a process of executing the debugging information collection function, the core A writes, into the data header to replace default information, an identifier that is of the preset event and is used for triggering the core A to execute the debugging information collection function, and writes an identifier of the operation object of the preset event into the data body.

If the reason that the core A stops running is the preset event, the debugging unit is specifically configured to: after determining that the core A stops running, determine, by reading content of the data header, the reason that the core A stops running. Because the content of the data header includes the identifier of the preset event, the debugging unit can determine, according to the identifier of the preset event, that the reason that the core A stops running is the preset event.

Further, the debugging unit is specifically configured to: read, from the data body, the identifier of the operation object of the preset event according to the address of the data body located in the data header, and then mask the operation object of the preset event according to the identifier of the operation object of the preset event.

In another embodiment of the present invention, as shown in FIG. 8, the debugging unit includes a debugging agent and a debugger. It should be noted that, the debugging agent and the debugger may be located in a same host machine, or may be located in different host machines. Referring to the remote debugging system shown in FIG. 2, the debugging agent and the debugger are respectively located in different host machines. The debugging agent is located in a first host machine, and the debugger is located in a second host machine.

If the debugging unit includes the debugging agent and the debugger, and the reason that the core A stops running is the preset event, the debugging agent is specifically configured to: after determining that the core A stops running, determine the reason that the core A stops running, and if the reason that the core A stops running is the preset event, report a second message to the debugger. The second message includes an identifier indicating that the core A stops running and the identifier of the preset event.

Further, the debugging agent is specifically configured to: after determining, in a polling manner, that the core A stops running, determine, by reading the identifier that is of the preset event and is included in the content of the data header, that the reason that the core A stops running is the preset event; and report, to the debugger, the second message including the identifier indicating that the core A stops running and the identifier of the preset event.

The debugger is specifically configured to: after receiving the second message, obtain the debugging information of the preset event, and mask the operation object of the preset event according to the debugging information of the preset event.

Further, the debugger is specifically configured to: read, from the data body, the identifier of the operation object of the preset event or the identifier of the operation object of the preset event according to the identifier that is of the preset event and is in the second message, and mask the operation object of the preset event according to the debugging information of the preset event.

The debugger is specifically configured to instruct the debugging agent to send a second stop termination instruction to the core A. The second stop termination instruction is used to instruct the core A to resume running.

It should be noted that, if the reason that the core A stops running is a reason other than the preset event, the debugging unit in the debugging apparatus provided in this embodiment of the present invention is further configured to instruct the core A to resume running, to collect the debugging information of the preset event.

Specifically, if the preset event is the kernel module unloading function, the process deletion function, or the thread deletion function, and the reason that the core A stops running is a reason other than the preset event, the debugging unit is specifically configured to: after determining that the core A stops running, determine, by reading the content of the data header, the reason that the core A stops running. Because the content of the data header includes the first default information, the debugging unit can determine, according to the first default information, that the reason that the core A stops running is a reason other than the preset event.

In another embodiment of the present invention, as shown in FIG. 8, if the debugging unit includes a debugging agent and a debugger, and the reason that the core A stops running is a reason other than the preset event, the debugging agent is specifically configured to: after determining that the core A stops running, determine the reason that the core A stops running, and if the reason that the core A stops running is a reason other than the preset event, send a first stop termination instruction to the core A. The first stop termination instruction is used to instruct the core A to resume running, to collect the debugging information of the preset event.

With reference to the foregoing explanation, it can be learned that the debugging agent is specifically configured to: after determining, in a polling manner, that the core A stops running, read the content of the data header that includes the first default information; and determine, according to the first default information, that the reason that the core A stops running is a reason other than the preset event.

In still another embodiment of the present invention, if the debugging unit includes the debugging agent and the debugger, and the reason that the core A stops running is a reason other than the preset event, the debugging agent is specifically configured to: after determining, in a polling manner, that the core A stops running, determine the reason that the core A stops running, and if the reason that the core A stops running is a reason other than the preset event, report a first message to the debugger. The first message includes the identifier indicating that the core A stops running and a default identifier.

With reference to the foregoing explanation, it can be learned that the debugging agent is specifically configured to: after determining, in a polling manner, that the core A stops running, read the content of the data header that includes the first default information; determine, according to the first default information, that the reason that the core A stops running is a reason other than the preset event; and report, to the debugger, the identifier indicating that the core A stops running and the default identifier.

The debugger is specifically configured to: after receiving the first message, instruct the debugging agent to send a first stop termination instruction to the core A. The first stop termination instruction is used to instruct the core A to resume running.

The debugging agent is specifically configured to send the first stop termination instruction to the core A.

It can be learned from above that, according to the debugging apparatus provided in this embodiment of the present invention, after determining that a core A of a multi-core processor on a target machine side stops running, if it is determined that the reason that the core A stops running is a preset event, the debugging apparatus obtains, from the target machine side, debugging information of the preset event, and masks an operation object of the preset event according to the debugging information of the preset event, so as to debug the operation object of the preset event. In this embodiment of the present invention, the preset event is a kernel module unloading function, a process deletion function, or a thread deletion function, the operation object of the preset event is a kernel module, a process, or a thread, the kernel module is kernel mode code, and the process and the thread are user mode code. Therefore, by means of the debugging apparatus provided in this embodiment of the present invention, not only the kernel mode code can be masked, but also the user mode code can be masked.

Embodiment 4

Figure 9:
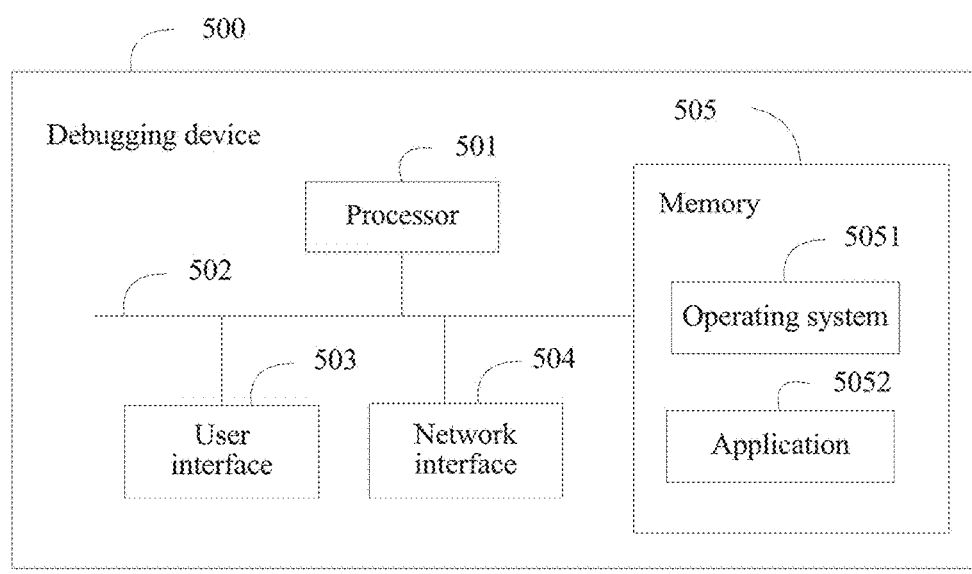
FIG. 9 is a schematic structural diagram of a debugging device according to an embodiment of the present invention.

Referring to FIG. 9, FIG. 9 is a structural block diagram of a debugging device 500 according to an embodiment of the present invention. The debugging device 500 is applied to the debugging method shown in Embodiment 1 and the remote debugging system shown in FIG. 1, and the debugging device 900 is a specific implementation manner of a host machine in the remote debugging system shown in FIG. 1. Specifically, as shown in FIG. 9, the debugging device 500 includes: at least one processor 501, at least one network interface 504 or another user interface 503, a memory 505, and at least one communications bus 502. The communications bus 502 is configured to implement connection and communication between these components. The debugging device 500 optionally includes the user interface 503, including a display (such as a touchscreen, an LCD, a CTR, a holographic (Holographic) device, or a projector (Projector)), a keyboard or a click device (such as a mouse, a trackball (trackball), a touchpad, or a touchscreen).

The memory 505 may include a read-only memory and a random access memory, and may provide an instruction and data for the processor. A part of the memory 505 may further include a non-volatile random access memory (NVRAM).

In some embodiments, the memory 505 stores the following elements, executable modules or data structures, or a subset thereof, or an extension set thereof:

an operating system 5051, including various system programs, such as a framework layer, a kernel library layer, and a drive layer, and configured to implement various basic services and process hardware-based tasks; and an application module 5052, including various applications, such as a launcher (launcher), a media player (Media Player), and a browser (Browser), and configured to implement various application services.

In this embodiment of the present invention, the processor 501 is configured to: after determining that the core A stops running, determine a reason that the core A stops running. A target machine located in the remote debugging system includes a multi-core processor, and the multi-core processor includes the core A.

It should be noted that, there is preset storage space in a memory of the target machine side, the preset storage space is specified by a debugging engineer in the memory of the target machine in advance, and both a size and an address of the preset storage space are fixed. The preset storage space is used to store a data header. Initially, the data header includes first default information and an address of a data body, and certainly, the first default information may be empty. The data body includes second default information, and certainly, the second default information may also be empty.

As shown in FIG. 6.2, if the preset event is a kernel module unloading function, a process deletion function, or a thread deletion function, and the core A stops running after completing execution of the debugging information collection function, in a process of executing the debugging information collection function, the core A writes, into the data header to replace default information, an identifier that is of the preset event and is used for triggering the core A to execute the debugging information collection function, and writes an identifier of the operation object of the preset event into the data body. As shown in FIG. 6.1, if the core A stops running due to another reason, the data header still includes the first default information and the address of the data body, and the data body still includes the second default information.

The processor 901 is specifically configured to: after determining that the core A stops running, determine, by reading content of the data header, the reason that the core A stops running; if the data header includes the identifier of the preset event, determine that the reason that the core A stops running is the preset event; and if the data header includes the first default information, determine that the reason that the core A stops running is a reason other than the preset event, If the reason that the core A stops running is the preset event, the processor 501 is configured to: obtain debugging information of the preset event, and mask the operation object of the preset event according to the debugging information of the preset event. The preset event is a kernel module unloading function, a process deletion function, or a thread deletion function, and the operation object of the preset event is a kernel module, a process, or a thread.

According to the foregoing description in this embodiment, it can be determined that the debugging information of the preset event includes the identifier of the preset event and the identifier of the operation object of the preset event.

It should be noted that, if the preset event is the kernel module unloading function, the operation object of the preset event is a kernel module. If the preset event is the process deletion function, the operation object of the preset event is a process. If the preset event is the thread deletion function, the operation object of the preset event is a thread.

It should be noted that, if the preset event is the kernel module unloading function, the process deletion function, or the thread deletion function, and the reason that the core A stops running is the preset event, the processor 901 is specifically configured to: read, from the data body, the identifier of the operation object of the preset event according to the address of the data body located in the data header, and then mask the operation object of the preset event according to the identifier of the operation object of the preset event.

The memory 505 is configured to store the debugging information of the preset event.

The processor 501 is further configured to instruct the core A to resume running.

In another embodiment of the present invention, if the reason that the core A stops running is a reason other than the preset event, the processor 501 is further configured to instruct the core A to resume running, to collect the debugging information of the preset event.

It can be learned from above that, according to the debugging device provided in this embodiment of the present invention, after determining that a core A of a multi-core processor on a target machine side stops running, if it is determined that the reason that the core A stops running is a preset event, the debugging device obtains, from the target machine side, debugging information of the preset event, and masks an operation object of the preset event according to the debugging information of the preset event. In this embodiment of the present invention, the preset event is a kernel module unloading function, a process deletion function, or a thread deletion function, the operation object of the preset event is a kernel module, a process, or a thread, the kernel module is kernel mode code, and the process and the thread are user mode code. Therefore, by means of the debugging device provided in this embodiment of the present invention, not only the kernel mode code can be masked, but also the user mode code can be masked.

Mutual reference may be made to the foregoing embodiments. It may be clearly understood by a person skilled in the art that, for the purpose of convenient and brief description, for a detailed working process of the foregoing apparatus, device, and unit, reference may be made to a corresponding process in the foregoing method embodiments, and details are not described herein again.

In the several embodiments provided in this application, it should be understood that the disclosed method, apparatus, and device may be implemented in other manners. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It should be understood that, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of debugging, applied to a target machine in a remote debugging system, wherein the target machine comprises a multi-core processor, and the method comprises:
    executing, by a core A of the multi-core processor after completing execution of a preset event processing routine, a first debugging exception instruction located in a header of a debugging interface function, wherein the first debugging exception instruction is used to instruct the core A to stop running, and sending a running stop signal to other cores in a process of stopping running, wherein the running stop signal is used to instruct the other cores to stop running, the other cores refer to all cores that are located in the multi-core processor and that belong to a same logical group as the core A, and the preset event is a kernel module unloading function, a process deletion function, or a thread processing function;
    after receiving a first stop termination instruction and resuming running, executing, by the core A, a debugging information collection function to collect debugging information of the preset event, and stopping running after completing the execution of the debugging information collection function, wherein the first stop termination instruction is sent by a debugging apparatus in the remote debugging system after the debugging apparatus determines that the core A stops running and that a reason that the core A stops running is a reason other than the preset event, and wherein the debugging information collection function comprises the debugging interface function; and
    after receiving a second stop termination instruction and resuming running, sending, by the core A, a running resumption instruction to the other cores, wherein the running resumption instruction is used to instruct the other cores to resume running, the second stop termination instruction is sent by the debugging apparatus after the debugging apparatus masks an operation object of the preset event according to the debugging information of the preset event, and the operation object of the preset event is a kernel module, a process, or a thread.

2. The method according to claim 1, wherein
    the debugging information collection function further comprises a function associated with the preset event, a second debugging exception instruction is further set in a trailer of the debugging interface function, and the second debugging exception instruction is used to instruct the core A to stop running; and
    the executing, by the core A, a debugging information collection function to collect debugging information of the preset event, and stopping running after completing the execution of the debugging information collection function comprises:
    executing, by the core A, the function associated with the preset event to collect the debugging information of the preset event, and then executing the second debugging exception instruction located in the trailer of the debugging interface function.

3. The method according to claim 2, wherein
    the function associated with the preset event is located in a kernel debugging stub, and the kernel debugging stub is implanted into an operating system of the target machine in advance.

4. The method according to claim 1, wherein
    when the preset event is the kernel module unloading function, the operation object of the preset event is a kernel module;
    when the preset event is the process deletion function, the operation object of the preset event is a process; and
    when the preset event is the thread processing function, the operation object of the preset event is a thread.

5. The method according to claim 1, wherein the debugging information of the preset event comprises an identifier of the operation object of the preset event.

6. The method according to claim 1, wherein the multi-core processor is integrated into a system on chip SOC;
    the sending, by a core A, a running stop signal to other cores, wherein the running stop signal is used to instruct the other cores to stop running comprises:
    sending, by the core A, the running stop signal to the other cores by using a hardware cross-trigger network of the SOC, wherein the running stop signal is used to instruct the other cores to stop running; and
    the sending, by the core A, a running resumption instruction to the other cores, wherein the running resumption instruction is used to instruct the other cores to resume running comprises:
    sending, by the core A, the running resumption instruction to the other cores by using the hardware cross-trigger network of the SOC, wherein the running resumption instruction is used to instruct the other cores to resume running.

7. A method of debugging, executed by a debugging apparatus deployed in a host machine, the debugging apparatus comprising a debugger and a debugging agent, wherein the host machine is located in a remote debugging system, and the method comprises:
    determining, by the debugging agent after determining in a polling manner that a core A stops running, a reason that the core A stops running, wherein the core A belongs to a multi-core processor of a target machine in the remote debugging system, and if the reason that the core A stops running is a preset event, reporting a second message to the debugger, wherein the second message comprises an identifier indicating that the core A stops running and an identifier of the preset event; wherein the preset event is a kernel module unloading function, a process deletion function, or a thread deletion function, and an operation object of the preset event is a kernel module, a process, or a thread;

after receiving the second message, obtaining, by the debugger, debugging information of the preset event, and masking the operation object of the preset event according to the debugging information of the preset event, and instructing, by the debugger, the debugging agent to send a second stop termination instruction to the core A, wherein the second stop termination instruction is used to instruct the core A to resume running.

8. The method according to claim 7, wherein if the reason that the core A stops running is a reason other than the preset event, instructing, by the debugging apparatus, the core A to resume running, and to collect the debugging information of the preset event.

9. The method according to claim 7, wherein the debugging information of the preset event comprises an identifier of the operation object of the preset event; and the obtaining, by the debugging apparatus, debugging information of the preset event, and masking an operation object of the preset event according to the debugging information of the preset event comprises:

obtaining, by the debugging apparatus, the identifier of the operation object of the preset event, and masking the operation object of the preset event according to the identifier of the operation object of the preset event.

10. The method according to claim 7, wherein the determining, by the debugging apparatus after determining that a core A stops running, a reason that the core A stops running, and if the reason that the core A stops running is a reason other than the preset event, instructing, by the debugging apparatus, the core A to resume running, and to collect the debugging information of the preset event which comprises:

after determining, in a polling manner, that the core A stops running, determining, by the debugging agent, the reason that the core A stops running, and if the reason that the core A stops running is a reason other than the preset event, sending, by the debugging agent, a first stop termination instruction to the core A, wherein the first stop termination instruction is used to instruct the core A to resume running, and to collect the debugging information of the preset event.

11. The method according to claim 7, wherein the determining, by the debugging apparatus after determining that a core A stops running, a reason that the core A stops running, and if the reason that the core A stops running is a reason other than the preset event, instructing, by the debugging apparatus, the core A to resume running, and to collect the debugging information of the preset event which comprises:

after determining, in a polling manner, that the core A stops running, determining, by the debugging agent, the reason that the core A stops running, and if the reason that the core A stops running is a reason other than the preset event, reporting a first message to the debugger, wherein the first message comprises the identifier indicating that the core A stops running and a default identifier; and after receiving the first message, instructing, by the debugger, the debugging agent to send a first stop termination instruction to the core A, wherein the first stop termination instruction is used to instruct the core A to resume running, and to collect the debugging information of the preset event.

12. A multi-core processor, applied to a target machine in a remote debugging system, wherein the multi-core processor comprising:

a core A;

other cores; and an input port, and the other cores refer to all cores that are located in the multi-core processor and that belong to a same logical group as the core A, wherein the core A is configured to: execute, by the core A of the multi-core processor after completing execution of a preset event processing routine, a first debugging exception instruction located in a header of a debugging interface function, wherein the first debugging exception instruction is used to instruct the core A to stop running, and send a running stop signal to the other cores in a process of stopping running, wherein the running stop signal is used to instruct the other cores to stop running, and the preset event is a kernel module unloading function, a process deletion function, or a thread deletion function;

the input port is configured to: receive a first stop termination instruction, and forward the first stop termination instruction to the core A, wherein the first stop termination instruction is sent by a debugging apparatus in the remote debugging system after the debugging apparatus determines that the core A stops running and that a reason that the core A stops running is a reason other than the preset event;

the core A is further configured to: after receiving the first stop termination instruction and resuming running, execute a debugging information collection function to collect debugging information of the preset event, and stop running after completing the execution of the debugging information collection function, wherein the debugging information collection function comprises the debugging interface function;

the input port is further configured to: receive a second stop termination instruction, and forward the second stop termination instruction to the core A, wherein the second stop termination instruction is sent by the debugging apparatus after the debugging apparatus masks an operation object of the preset event according to the debugging information of the preset event, and the operation object of the preset event is a kernel module, a process, or a thread; and the core A is further configured to send a running resumption instruction to the other cores after receiving the second stop termination instruction and resuming running, wherein the running resumption instruction is used to instruct the other cores to resume running.

13. The multi-core processor according to claim 12, wherein the debugging information collection function further comprises a function associated with the preset event, a second debugging exception instruction is further set in a trailer of the debugging interface function, and the second debugging exception instruction is used to instruct the core A to stop running; and the core A is configured to: execute the function associated with the preset event to collect the debugging information of the preset event, and then execute the second debugging exception instruction located in the trailer of the debugging interface function.

14. The multi-core processor according to claim 13, wherein
the function associated with the preset event is located in a kernel debugging stub, and the kernel debugging stub is implanted into an operating system of the target machine in advance.

15. The multi-core processor according to claim 12, wherein the multi-core processor is integrated into a system on chip SOC;
the core A is configured to send the running stop signal to the other cores by using a hardware cross-trigger network of the SOC, wherein the running stop signal is used to instruct the other cores to stop running; and
the core A is configured to send the running resumption instruction to the other cores by using the hardware cross-trigger network of the SOC, wherein the running resumption instruction is used to instruct the other cores to resume running.

16. A debugging apparatus, wherein the debugging apparatus is deployed in a host machine in a remote debugging system, and the debugging apparatus comprising:
a debugging unit comprising a debugger and a debugging agent; and
a receiving unit, configured to: receive a message used for instructing a core A to stop running, and forward the message used for instructing the core A to stop running to the debugging unit, wherein a target machine located in the remote debugging system comprises a multi-core processor, and the multi-core processor comprises the core A;
the debugging agent is configured to: after determining that the core A stops running, determine a reason that the core A stops running, and if the reason that the core A stops running is a preset event, report a second message to the debugger, wherein the second message comprises an identifier indicating that the core A stops running and an identifier of the preset event, wherein the preset event is a kernel module unloading function, a process deletion function, or a thread deletion function, and an operation object of the preset event is a kernel module, a process, or a thread; and
the debugger is configured to: after receiving the second message, obtain debugging information of the preset event, and mask the operation object of the preset event according to the debugging information of the preset event; and
the debugger is configured to instruct the debugging agent to send a second stop termination instruction to the core A, wherein the second stop termination instruction is used to instruct the core A to resume running.

17. The debugging apparatus according to claim 16, wherein
if the reason that the core A stops running is a reason other than the preset event, the debugging apparatus is further configured to instruct the core A to resume running, and to collect the debugging information of the preset event.

18. The debugging apparatus according to claim 16, wherein the debugging information of the preset event comprises an identifier of the operation object of the preset event; and
the debugging apparatus is configured to: obtain the identifier of the operation object of the preset event, and mask the operation object of the preset event according to the identifier of the operation object of the preset event.

19. The debugging apparatus according to claim 16, wherein the debugging agent is configured to: after determining that the core A stops running, determine the reason that the core A stops running, and if the reason that the core A stops running is a reason other than the preset event, send a first stop termination instruction to the core A, wherein the first stop termination instruction is used to instruct the core A to resume running, and to collect the debugging information of the preset event.

20. The debugging apparatus according to claim 16, wherein;
the debugging agent is configured to: after determining that the core A stops running, determine the reason that the core A stops running, and if the reason that the core A stops running is a reason other than the preset event, report a first message to the debugger, wherein the first message comprises the identifier indicating that the core A stops running and a default identifier; and
the debugger is configured to: after receiving the first message, instruct the debugging agent to send a first stop termination instruction to the core A, wherein the first stop termination instruction is used to instruct the core A to resume running, and to collect the debugging information of the preset event.

* * * * *